(12) United States Patent
Sekino (10) Patent No.: US 9,711,896 B2
(45) Date of Patent: Jul. 18, 2017

(54) CONNECTOR (71) Applicant: YAZAKI CORPORATION, Minato-ku, Tokyo (JP)

(72) Inventor: Tetsuya Sekino, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 32 days.

(21) Appl. No.: 14/919,973

(22) Filed: Oct. 22, 2015

(65) Prior Publication Data
US 2016/0043502 A1 Feb. 11, 2016

Related U.S. Application Data (63) Continuation of application No. PCT/JP2014/060700, filed on Apr. 15, 2014.

(30) Foreign Application Priority Data

Apr. 26, 2013 (JP) .................. 2013-093699

(51) Int. Cl.
*H01R 13/64* (2006.01)
*H01R 13/629* (2006.01)
(Continued)

(52) U.S. Cl.
CPC ......... *H01R 13/629* (2013.01); *H01R 13/622* (2013.01); *H01R 13/746* (2013.01);
(Continued)

(58) Field of Classification Search
CPC .. H01R 13/64; H01R 13/6456; H01R 13/642; H01R 13/631; H01R 13/629
(Continued)

(56) References Cited

U.S. PATENT DOCUMENTS 2,933,711 A * 4/1960 Eaton .................. H01R 13/633
  403/349
4,795,375 A * 1/1989 Williams ............... H01R 13/53
  439/680
(Continued)

FOREIGN PATENT DOCUMENTS

CN 1628400 A 6/2005
CN 1879261 A 12/2006
(Continued)

OTHER PUBLICATIONS

Official Action issued on Oct. 9, 2016 in the counterpart Chinese application.

*Primary Examiner* — Hien Vu
(74) *Attorney, Agent, or Firm* — Mots Law, PLLC (57) ABSTRACT

A connector includes: a sensor side connector section mounted to a connector mounting hole and fastened thereto by thread fastening and including a first housing part in which a first terminal is disposed; and a wire harness side connector section disposing a second terminal and including a second housing part capable of being fitted to the first housing part. The connector mounting hole includes a key groove, and the first housing part includes a key protrusion. A bolt prevented from moving axially and supported rotatably is provided on the outer periphery of the first housing part. Screwing the bolt into the connector mounting hole fastens the first housing part to the connector mounting hole by thread fastening.

3 Claims, 8 Drawing Sheets (51) Int. Cl.
   *H01R 13/74* (2006.01)
   *H01R 13/622* (2006.01)
   *H01R 13/627* (2006.01)
   *F16B 37/14* (2006.01)

(52) U.S. Cl.
   CPC ........ *F16B 37/145* (2013.01); *H01R 13/6273* (2013.01); *H01R 2201/20* (2013.01)

(58) Field of Classification Search
   USPC .......................................... 439/680, 357, 926
   See application file for complete search history.

(56) References Cited

U.S. PATENT DOCUMENTS

| | | | | |
|---|---|---|---|---|
| 5,449,302 A | * | 9/1995 | Yarbrough | H01R 13/645 439/680 |
| 6,364,681 B1 | | 4/2002 | Watanabe | |
| 6,848,948 B1 | | 2/2005 | Khemakhem et al. | |
| 6,957,971 B2 | * | 10/2005 | Wu | H01R 13/5213 439/320 |
| 7,422,486 B2 | * | 9/2008 | Hoff | G06F 3/023 439/655 |
| 7,435,112 B1 | * | 10/2008 | Miller | H01R 13/502 439/133 |
| 7,544,099 B2 | * | 6/2009 | Godovich | H01R 13/746 439/639 |
| 2005/0095900 A1 | | 5/2005 | Khemakhem et al. | |
| 2005/0130487 A1 | | 6/2005 | Bartholoma et al. | |
| 2006/0030218 A1 | | 2/2006 | Khemakhem et al. | |
| 2007/0082556 A1 | | 4/2007 | Khemakhem et al. | |
| 2009/0011654 A1 | | 1/2009 | Khemakhem et al. | |
| 2011/0065323 A1 | | 3/2011 | Khemakhem et al. | |
| 2012/0258638 A1 | | 10/2012 | Yamada et al. | |

FOREIGN PATENT DOCUMENTS

| | | |
|---|---|---|
| CN | 102714376 A | 10/2012 |
| JP | H01-096682 U | 6/1989 |
| JP | H04-259769 A | 9/1992 |
| JP | H06-007174 U | 1/1994 |
| JP | 2000-182702 A | 6/2000 |
| JP | 2004-259769 A | 9/2004 |
| JP | 2011-181199 A | 9/2011 |
| JP | 2011-249012 A | 12/2011 |

* cited by examiner

CONNECTOR

CROSS REFERENCE TO RELATED APPLICATIONS

This application is a continuation of International Application No. PCT/JP2014/060700, filed Apr. 15, 2014, and based upon and claims the benefit of priority from Japanese Patent Application No. 2013-093699, filed Apr. 26, 2013, the entire contents of all of which are incorporated herein by reference.

TECHNICAL FIELD

The present application relates to a connector which electrically connects a pair of terminals with each other by fitting a pair of housing parts to each other.

BACKGROUND ART

Figure 8:
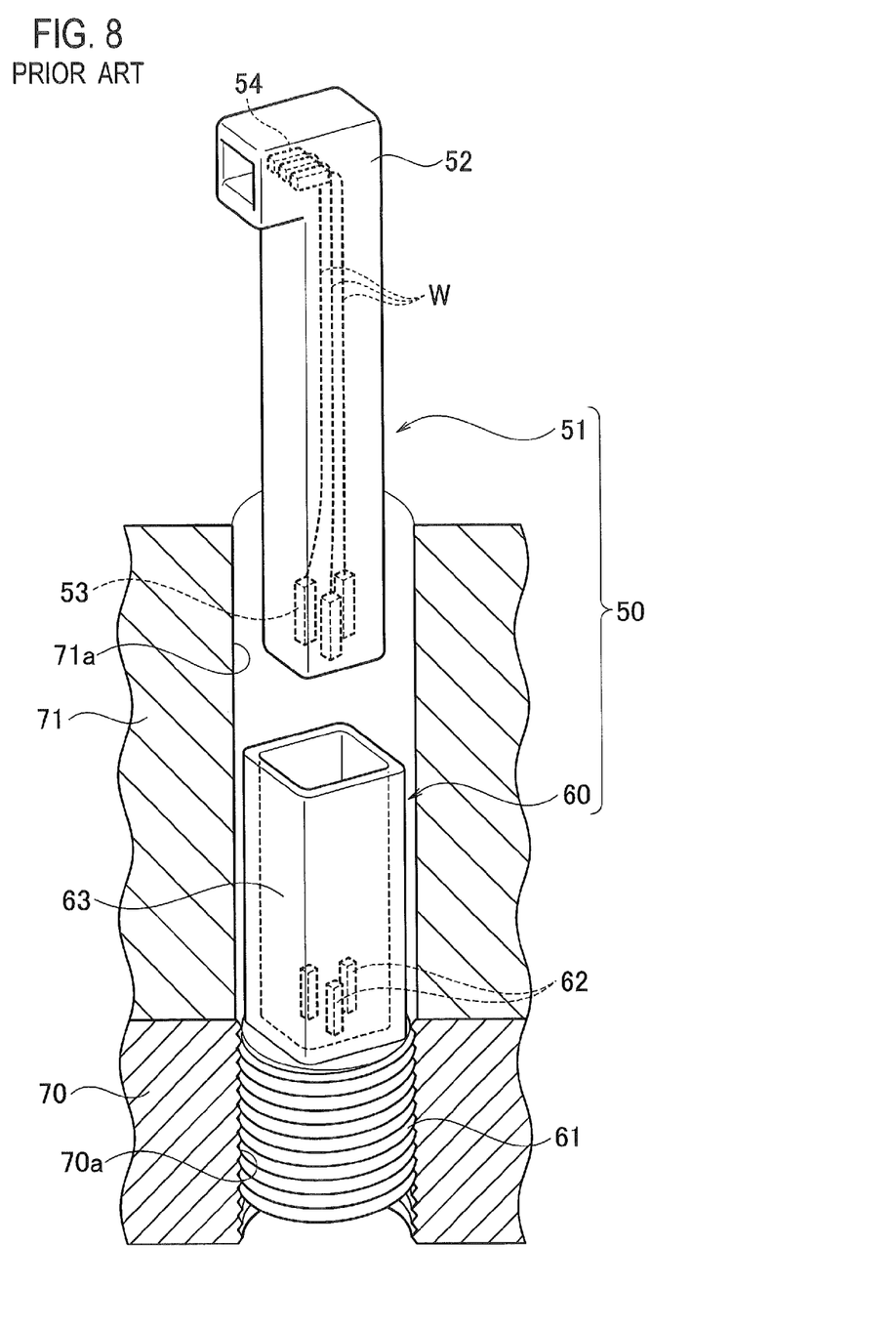
FIG. 8 is a perspective view illustrating a process of mounting a sensor side connector section of a conventional connector on a connector mounting hole.

As for this type of connector, there have been proposed a variety of devices conventionally (see JP 2000-182702 A). FIG. 8 illustrates a conventional connector. In FIG. 8, the conventional connector 50 is installed in a cylinder head 70 of an engine to pick up an output of a built-in fuel pressure sensor element (not illustrated). The connector 50 includes a wire harness side connector section 51 and a sensor side connector section 60.

The wire harness side connector section 51 includes a housing part 52. Inside the housing part 52, a first terminal 53 is disposed close to one end of the housing part 52. Also inside the housing part 52, an external terminal 54 is disposed close to the other end of the housing part 52. The first terminal 53 and the external terminal 54 are connected to each other through wires W accommodated in the housing part 52.

The sensor side connector section 60 includes a sensor body part 61 in which a sensor element (not illustrated) is disposed, and a housing part 63 which is fixed to the sensor body part 61 and in which a second terminal 62 is disposed. A threaded part 61a is formed on the outer circumference of the sensor body part 61. By screwing the sensor body part 61 into a threaded hole 70a of the cylinder head 70, the sensor side connector section 60 is installed in the cylinder head 70.

Next, the fitting operation of the connector 50 will be described. A head cover 71 is mounted on the cylinder head 71. First, the sensor side connector section 60 is inserted through a hole 71a of the head cover 71 and installed in the cylinder head 70. Next, the wire harness side connector section 51 is inserted into the hole 71a of the head cover 71 and assembled to the sensor side connector section 60.

SUMMARY

In the conventional connector 50, the sensor side connector section 60 is screw fastened to the threaded hole 70a of the cylinder head 70. Accordingly, the rotational position (orientation) of the housing part 63 of the sensor side connector section 60 is so non-constant. In assembling the wire harness side connector section 51, the housing part 63 of the sensor side connector part 60 is positioned in the back of the hole 71a of the head cover 71. For this reason, the housing part 63 of the sensor side connector section 60 cannot be visually recognized clearly, so that it is difficult to align the housing part 52 of the wire harness side connector section 51 with a formal fitting rotational position with respect to the housing part 63 of the sensor side connector section 60, causing a problem of inferior fitting workability.

In order to solve the above mentioned problem, therefore, an object of the present application is to provide a connector which is provided, on one side, with a housing part to be screw fastened to a connector mounting hole and which allows the housing part on one side to be mounted at a given rotation angle, thereby providing superior workability in fitting a pair of housing parts.

A connector according to an aspect of the present application includes: a first connector section mounted to a connector mounting hole by thread fastening and including a first housing part in which a first terminal is disposed; and a second connector section disposing a second terminal and including a second housing part capable of being fitted to the first housing part, wherein the first terminal and the second terminal are connected to each other at a fitting complete position of the first housing part and the second housing part. The connector mounting hole and the first housing part are provided with a rotation angle restricting mechanism which allows the first housing part to be inserted into the connector mounting hole only when the rotation angle is a desired rotation angle. The first housing part is provided, on an outer circumference thereof, with a thread fastening component whose axial movement is restricted and which is supported rotatably. The first housing part is thread fastened to the connector mounting hole by screwing the thread fastening component into the connector mounting hole.

The connector may further include a pair of position restricting walls which are provided so as to protrude from an outer circumference of the first housing part on both outsides of the thread fastening component in an axial direction along which the thread fastening component is arranged, thereby restricting an axial movement of the first housing part in relation to the thread fastening component. In this case, at least one of the pair of position restricting walls permits a movement of the thread fastening component from an end of the first housing part to a position where the thread fastening component is to be arranged and also inhibits a movement of the thread fastening component from the position where the thread fastening component is to be arranged to the end of the first housing part.

The rotation angle restricting mechanism may include: a key groove provided in one of the connector mounting hole and the first housing part; and a key protrusion provided in the other of the connector mounting hole and the first housing part.

The thread fastening component may include a bolt whose outer circumferential surface is formed with a screw part.

With the connector according to the aspect of the present application, provided that the rotation angle of the first housing part is set to a predetermined rotation angle, if screwing the thread fastening component into the connector mounting hole by thread fastening, then the first housing part is mounted, at the predetermined rotation angle, on the connector mounting hole. Therefore, it is possible to perform the fitting operation between the first housing part and the second housing part easily.

DESCRIPTION OF EMBODIMENTS

An embodiment of the present application will be described with reference to FIGS. 1 to 7.

A connector 1 according to the embodiment includes a combustion pressure sensor element (not illustrated) integrally and is installed in an engine 20.

The engine 20 includes a cylinder head 21, a head cover 22 arranged above the cylinder head 21, and a cylindrical part 23 interposed between the cylinder head 21 and the head cover 22. The cylinder head 21 is formed with a connector mounting hole 24, and a cylinder support hole 25 having a larger diameter than that of the connector mounting hole 24. The head cover 22 is formed, directly above the cylinder support hole 25, with a connector insertion hole 26 of the same diameter. Lower and upper ends of the cylindrical part 25 are disposed in the support hole 25 and the connector insertion hole 26, respectively. Therefore, from the connector insertion hole 26 of the head cover 22, the connector mounting hole 24 of the cylinder head 21 is visible through the interior of the cylindrical part 23.

Figure 3:
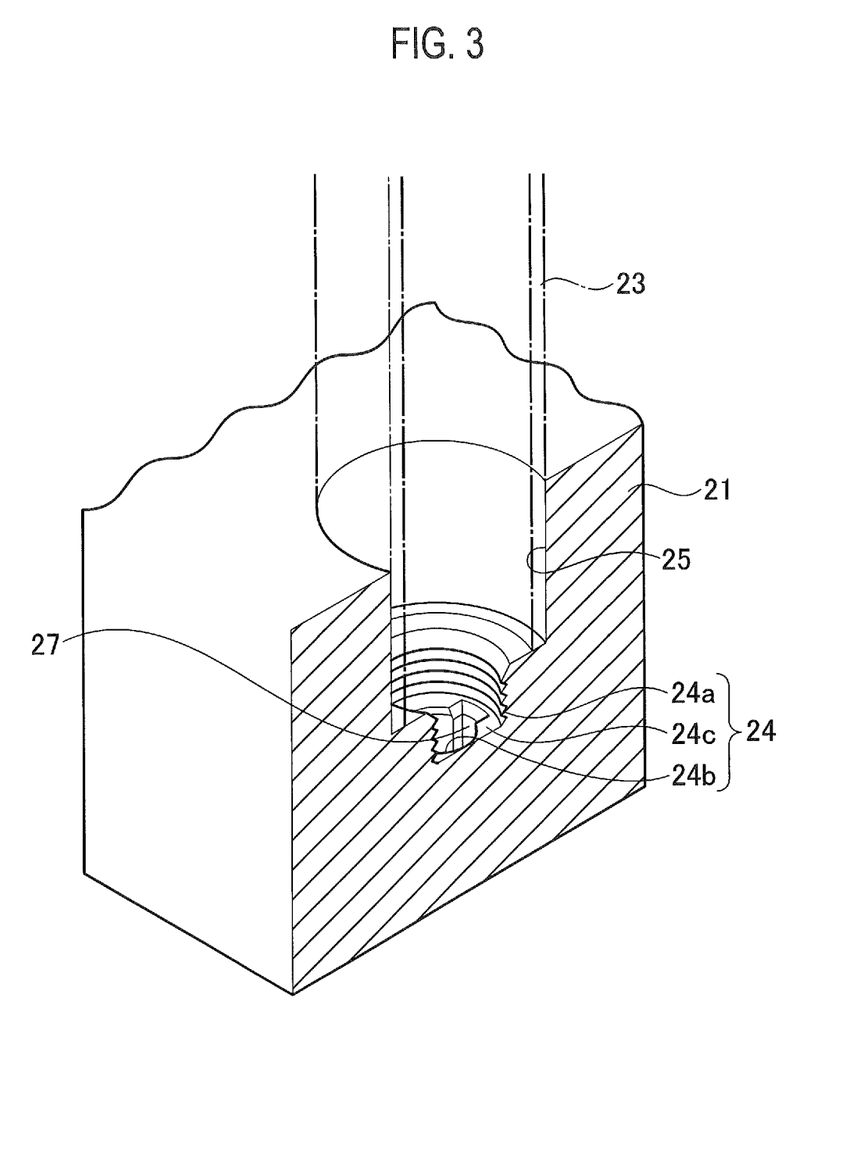
FIG. 3 is a perspective sectional view of an essential part of a connector mounting hole of the connector according to the embodiment.

The connector mounting hole 24 includes a screw hole 24a whose inner circumferential surface is formed with a thread, and a sensor part insertion hole 24b arranged in the back of the screw hole 24a and having a smaller diameter than that of the screw hole 24a. A stepped surface 24c is formed between the screw hole 24a and the sensor part insertion hole 24b. On the inner surface of the sensor part insertion hole 24b, a single key groove 27 is formed along the axial direction.

Figure 1:
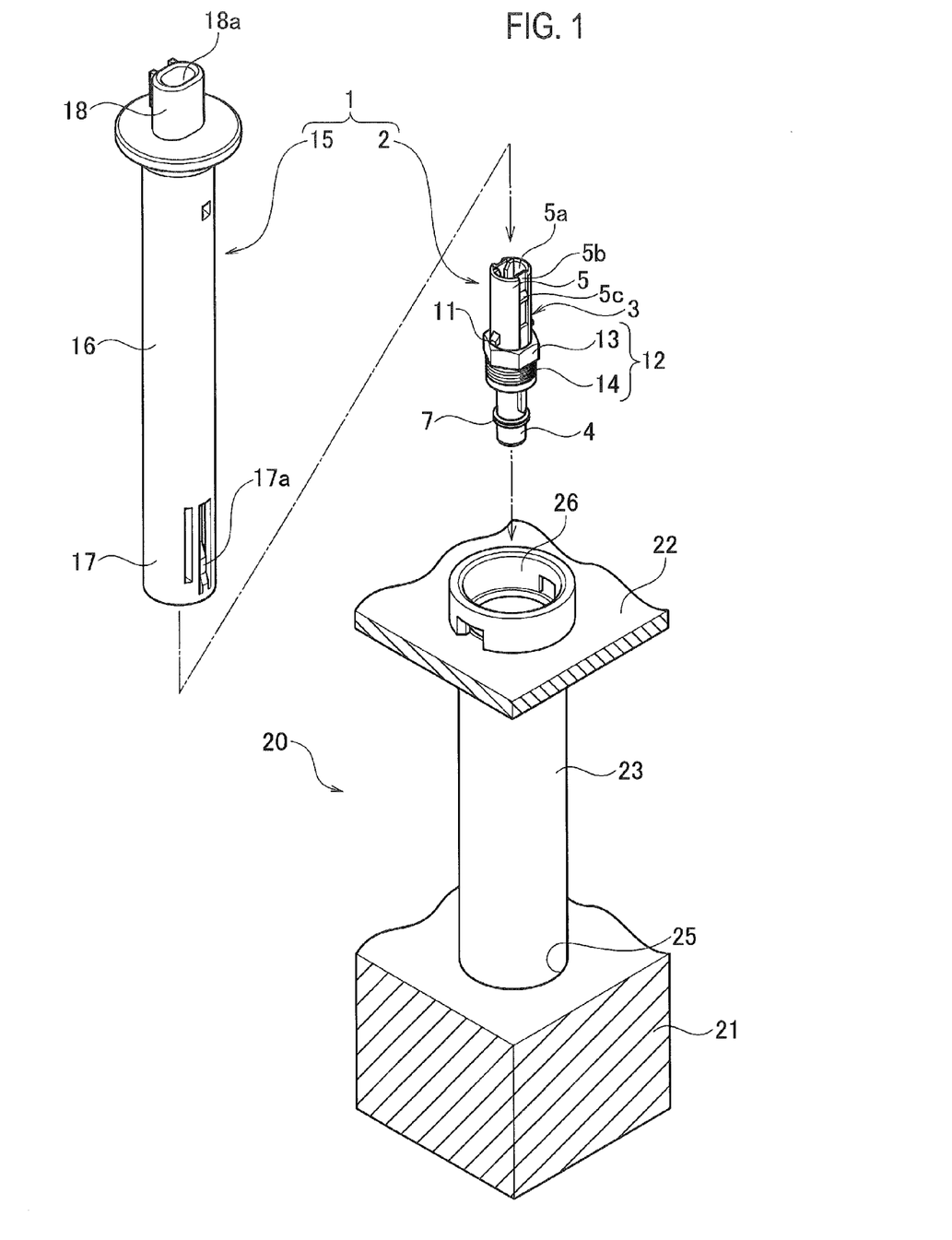
FIG. 1 is an exploded perspective view of a connector according to an embodiment.
Figures 2A, 2B, 2C:
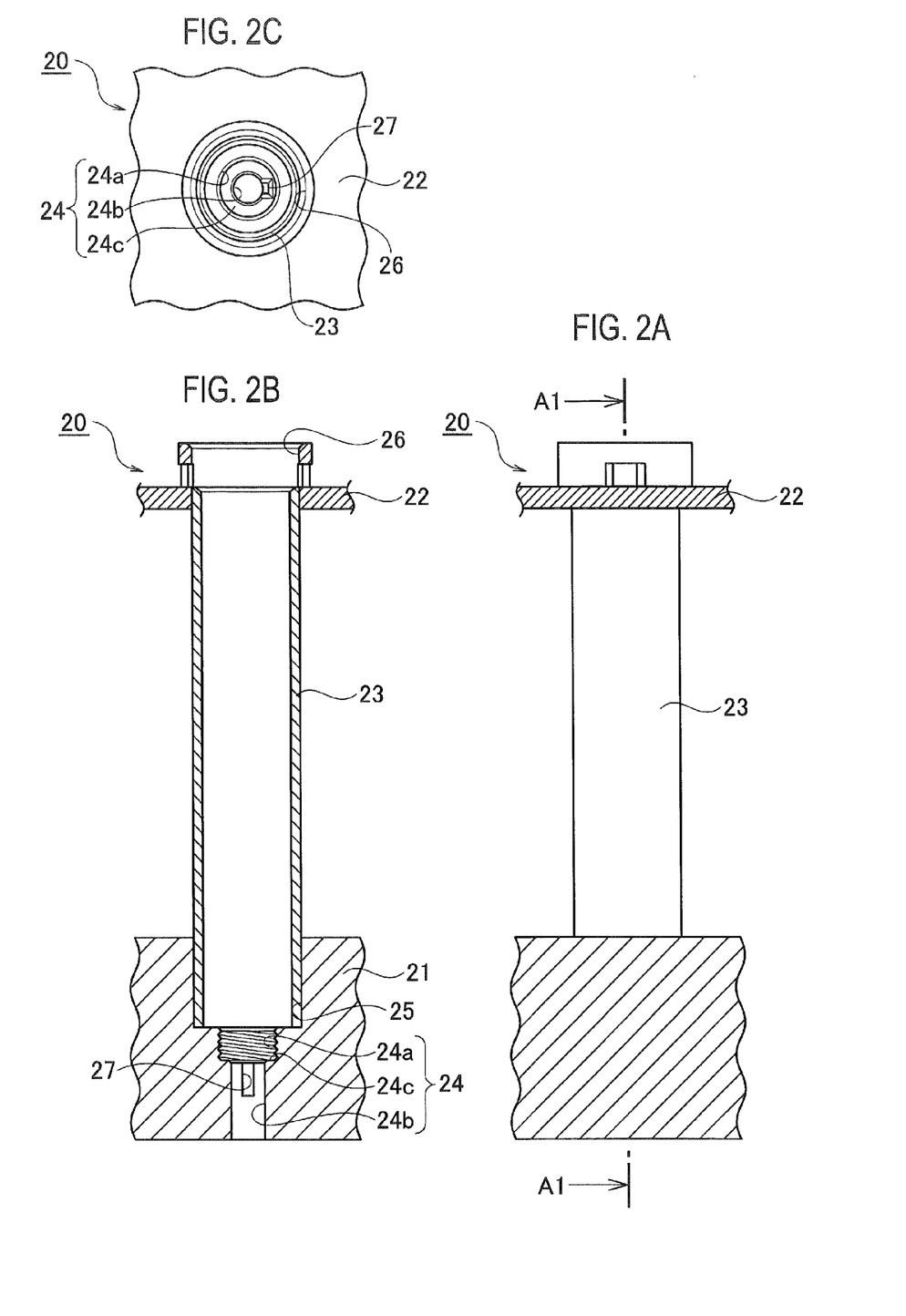
FIG. 2A is a front view of an engine essential part to which the connector according to the embodiment is attached.
FIG. 2B is a sectional view taken along a line A1-A1 of FIG. 2A.
FIG. 2C is a plan view of the engine essential part to which the connector according to the embodiment is attached.

The connector 1 includes a sensor side connector section 2 as a first connector section, and a wire harness side connector section 15 as a second connector section to be attached to the sensor side connector section 2.

The sensor side connector section 2 includes a first housing part 3, and a bolt 12 as a screw fastening component disposed on the outer circumference of the first housing part 3. The first housing part 3 integrally includes a sensor accommodating part 4 in which the combustion pressure sensor element (not illustrated) is disposed, a connector fitting part 5, and a bolt layout part 6 arranged between the sensor accommodating part 4 and the connector fitting part 5.

Figure 4A:
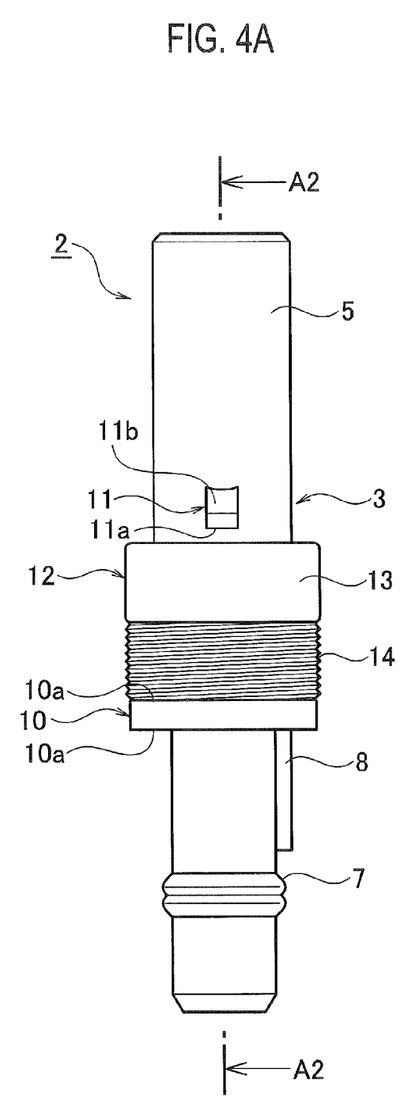
FIG. 4A is a front view of a sensor side connector section of the connector according to the embodiment.
Figure 4B:
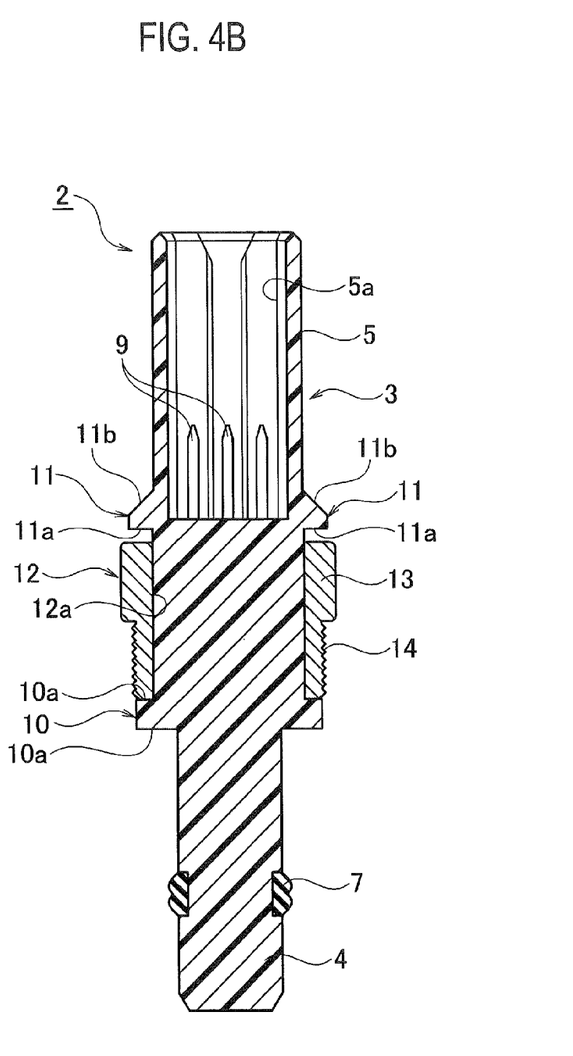
FIG. 4B is a sectional view taken along a line A2-A2 of FIG. 4A.

The sensor accommodating part 4 is established so as to have an outer diameter somewhat smaller than that of the connector mounting hole 24. A seal ring 7 is attached to the outer circumference of the sensor accommodating part 4. A clearance between the sensor accommodating part and the connector mounting hole 24 is sealed by the seal ring 7. The sensor accommodating part 4 is provided, on the outer circumference and above the seal ring 7, with a key protrusion 8 extending along the axial direction. The insertion of the sensor side connector section 2 into the connector mounting hole 24 is permitted under only condition that the key protrusion 8 has been inserted into a key groove 27. The rotation angle allowing the key protrusion 8 to be inserted into the key groove 27 is set to a desired orientation of the sensor side connector section 2. That is, the key protrusion 8 and the key groove 27 constitutes a rotation angle restricting mechanism that allows an insertion of the first housing part 3 into the connector mounting hole 24 only when the rotation angle is a desired rotation angle.

The connector fitting part 5 includes a terminal accommodating chamber 5a opening upward. A male terminal 9 as a first terminal is arranged in the terminal accommodating chamber 5a. The information about the combustion pressure sensor element is outputted from the male terminal 9 to an outside. The connector fitting part 5 is provided, on its outer circumference, with a positioning groove 5b extending in the axial direction, and a lock claw 5c projecting from the bottom surface of the positioning groove 5b.

A first position restricting wall 10 and a second position restricting wall 11 are formed so as to project from the outer circumference of the bolt layout part 6 while leaving a space in the axial direction. The first position restricting wall 10 is formed over the whole circumference of the bolt layout part. In the first position restricting wall 10, its upper and lower surfaces are formed so as to be respective vertical surfaces 10a perpendicular to the outer circumferential surface of the bolt layout part 6. The second position restricting wall 11 is formed by short width protrusions located in positions opposed by 180°. In the second position restricting wall 11, its respective lower surfaces are formed so as to be respective vertical surfaces 11a perpendicular to the outer circumferential surface of the bolt layout part 6, while respective upper surfaces are formed so as to be respective tapered surfaces 11b to the outer circumferential surface of the bolt layout part 6.

Figure 5:
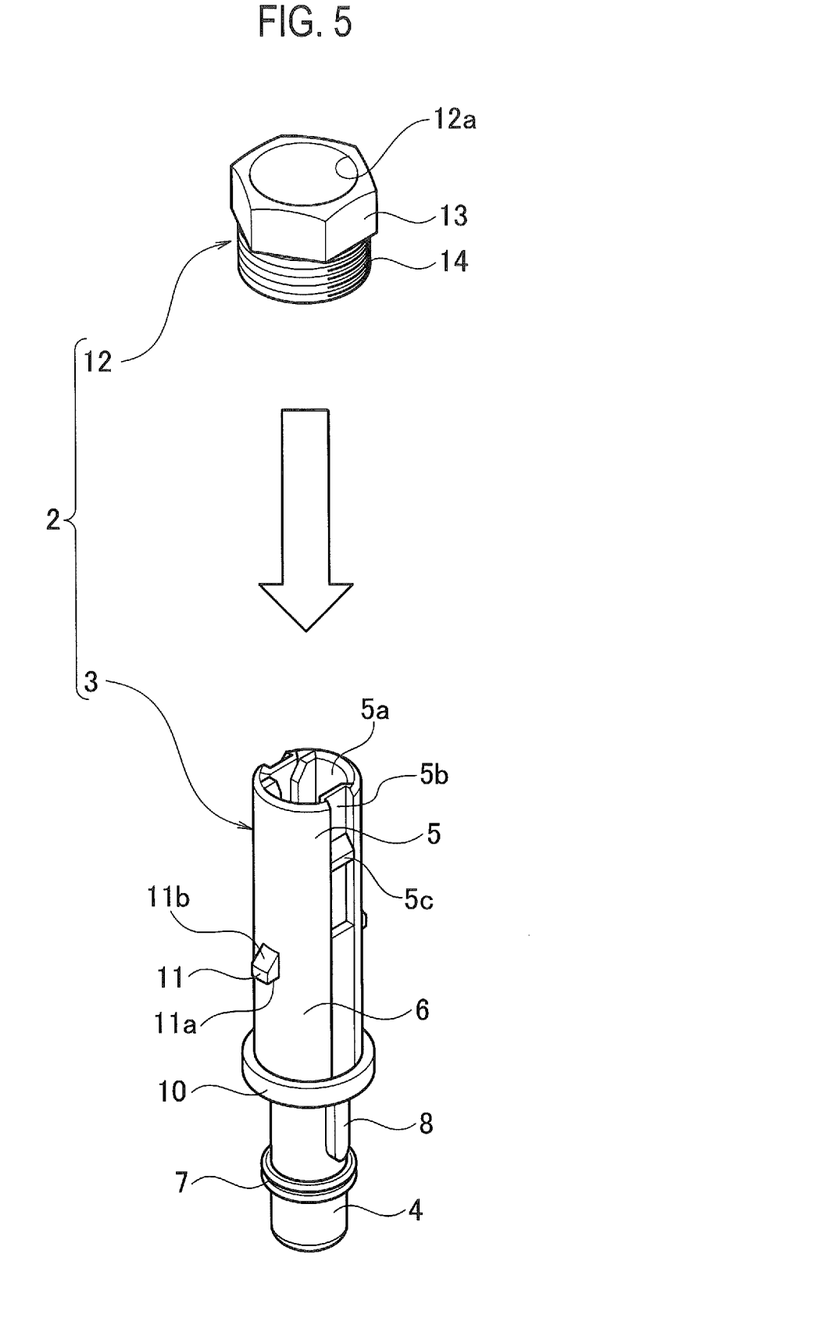
FIG. 5 is an exploded view of the sensor side connector section of the connector according to the embodiment in a pre-assembling state.

The bolt 12 includes a hexagonal protruding part 13, and a screw part 14 whose outer circumferential surface is formed with a thread. The bolt 12 is provided with a hole 12a having a dimension somewhat larger than the first housing part 3 (including the bolt layout part 6). The bolt 12 is fitted to the outer circumference of the bolt layout part 6 of the first housing part 3. The bolt 12 is restricted in its axial movement by the first position restricting wall 10 and the second position restricting wall 11 and also supported rotatably. When the bolt 12 is inserted from the top side of the first housing part 3, as illustrated in FIG. 5, the bolt 12 can climb over the tapered surfaces 11b of the second position restricting wall 11 and advance up to the bolt layout part 6. In this way, the bolt 12 can be fitted to the first housing part 3 easily. As the bolt 12 advanced up to the bolt layout part 6 is restricted in position by the respective vertical surfaces 10a, 11a of the first position restricting wall 10 and the second position restricting wall 11, the bolt 12 is unable to get out of the bolt layout part.

The wire harness side connector section 15 includes a second housing part 16. The second housing part 16 includes a connector fitting part 17 arranged on the lower end side, and an external connector fitting part 18 arranged on the upper end side. The connector fitting part 17 includes a terminal accommodating chamber (not illustrated) opening downward. A female terminal (not illustrated) as a second terminal is arranged in the terminal accommodating chamber. The connector fitting part 17 of the second housing part 16 is fitted to the connector fitting part 5 of the sensor side connector section 2. The connector fitting part 17 is provided with an arm lock 17a projecting into the terminal accommodating chamber. In fitting the connector, the arm lock 17a is inserted into the positioning groove 5b of the connector fitting part 5. Then, the arm lock 17a is locked to the lock claw 5c at the connector fitting completion position.

The external connector fitting part 18 includes a terminal accommodating chamber 18a opening upward. An external lead terminal (not illustrated) is disposed in the terminal receiving chamber 18a. The external lead terminal and the female terminal are electrically connected to each other by wires (not illustrated) routed in the second housing part 16. Fitted to the external connector fitting part 18 is a connector (not illustrated) for a wire harness which is routed in an engine room.

Figure 6:
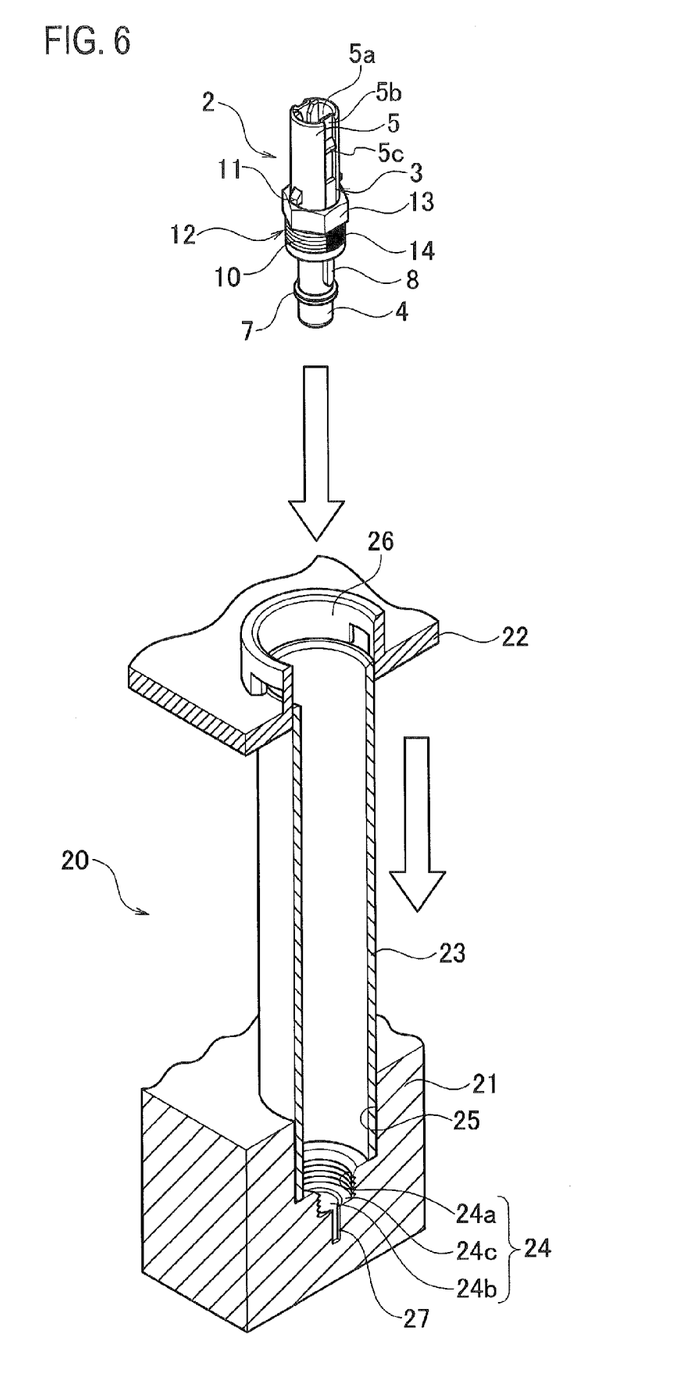
FIG. 6 is a perspective view illustrating the process of mounting the sensor side connector section of the connector according to the embodiment on a connector mounting part.

Next, the mounting operation of the connector 1 will be described. As illustrated in FIG. 6, the sensor side connector section 2 having the bolt 12 mounted on the first housing part 3 is inserted from the connector insertion hole 26 of the head cover 22 up to the vicinity of the cylinder head 21 in the back of the cylindrical part 23. Then, after aligning the key protrusion 8 of the sensor side connector section 2 with the key groove 27 of the connector mounting hole 24, the sensor accommodating part 4 of the sensor side connector section 2 is inserted into the sensor part insertion hole 24b of the connector mounting hole 24. Next, the bolt 12 is rotated in the fastening direction. Then, the bolt 12 is rotated in relation to the first housing part 3, so that the screw part 14 of the bolt 12 is screwed into the screw hole 24a of the connector mounting hole 24. By this screwing, the bolt 12 gets into the back of the connector mounting hole 24 gradually. When the bolt 12 gets into the back of the connector mounting hole 24 gradually, the bolt 12 presses the first position restricting wall 10. If the first housing part 3 has not been inserted up to the insertion completion position yet, the first housing part 3 conducts tracking movement to the back of the connector mounting hole 24. Here, since the first housing part 3 is in a state where its rotation is inhibited by the key groove 27 and the key protrusion 8, there is no possibility that the first housing part 3 rotates. When the sensor side connector section 2 is inserted up to a position where the lower surface of the first position restricting wall 10 of the first housing part 3 comes into pressure contact with the stepped surface 24c of the connector mounting hole 24, the mounting of the sensor side connector section 2 is completed.

Figure 7:
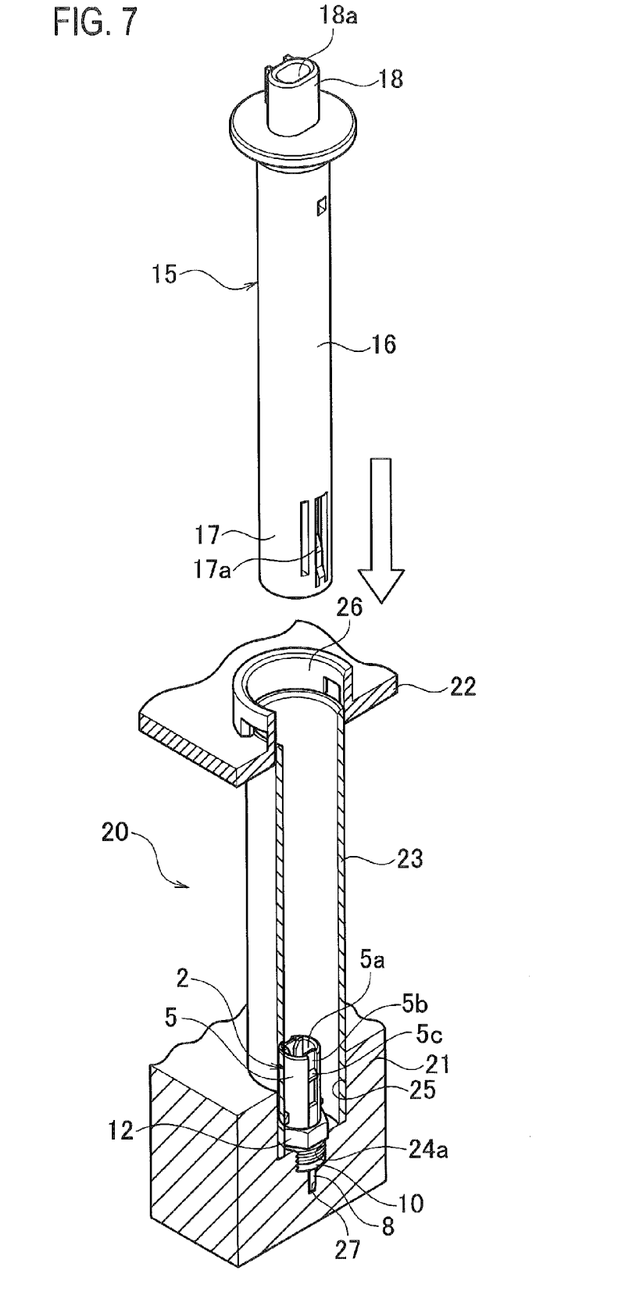
FIG. 7 is a perspective view illustrating the process of fitting a wire housing side connector section of the connector according to the embodiment to the sensor side connector section.

Next, as illustrated in FIG. 7, it is performed to insert the wire harness side connector section 15, while orienting its direction to a predetermined orientation, from the connector insertion hole 26 of the head cover 22 into the back of the cylindrical part 23. Then, the arm lock 17a of the connector fitting part 17 gets into the positioning groove 5b of the connector fitting part 5, so that the fitting is permitted. That is, as the rotation angle (fitting orientation) of the connector fitting part 5 of the sensor side connector section 2 accord with the desired orientation, the fitting between the connector sections can be accomplished by orienting the connector fitting part 17 of the wire harness side connector section 15 to the rotation angle (fitting orientation), easily.

When inserting the connector fitting part 17 of the wire harness side connector section 15 up to the fitting completion position of the connector fitting part 5 of the sensor side connector section 2, the arm lock 17a is locked to the lock claw 5c. At the connector fitting completion position, the male terminal 9 and female terminal (not illustrated) are electrically connected to each other. In this way, the mounting operation between the sensor side connector section 2 and the wire harness side connector section 15 is completed.

In the connector mounting hole 24 and the first housing part 3 of the sensor side connector section 2, as described above, there are provided the key protrusion 8 and the key groove 27 as the rotation angle restricting mechanism that permits the insertion of the first housing part 3 into the connector mounting hole 24 only when the rotation angle is a desired rotation angle. Additionally, the first housing part 3 is provided, on the outer circumference, with the bolt 12 which is restricted in its axial movement and which is supported by the first housing part 3 rotatably. Then, by screwing the bolts 12 into the screw hole 24a of the connector mounting hole 24, the first housing part 3 of the sensor side connector section 2 is fastened to the connector mounting hole 24 by thread fastening. Thus, as the rotation angle (fitting orientation) of the connector fitting part 5 of the sensor side connector section 2 is the desired orientation, the fitting between the connector sections can be accomplished by orienting the connector fitting part 17 of the wire harness side connector section 15 to the rotation angle (fitting orientation), easily.

The second position restricting wall 11 is constructed so as to permit a movement of the bolt 12 from the end of the housing part 3 to the bolt layout part 6 and also inhibit a movement of the bolt 12 from the bolt layout part 6 to the end of the housing part 3. Therefore, even if the first housing part 3 of the sensor side connector section 2 cannot be recognized clearly by a visual observation, the wire harness side connector section 15 can be easily mounted on the sensor side connector section 2.

Although the rotation angle restricting mechanism is composed of the key groove 27 provided in the connector mounting hole 24 and the key protrusion 8 provided on the first housing part 3, the key protrusion 8 may be provided in the connector mounting hole 24 while the key groove 27 is provided on the first housing part 3 conversely. Additionally, the rotation angle restricting mechanism may be composed of a configuration other than the key groove 27 and the key projection 8, as long as it can restrict the rotating orientation of the first housing part 3.

Although the thread fastening component is composed of the bolt 12 provided with the screw part 14 on the outer circumferential surface, the component may be composed of a configuration other than the bolt 12.

As the first position restricting wall 10 doubles as the falling preventing function of the bolt 12 and the pressure contact function of the connector mounting hole 24 with the stepped surface 24c of the bolt 12, the connector is simplified in constitution.

Although the connector 1 is mounted on the cylinder head 21 in the embodiment, the invention is not limited to this arrangement, as a matter of course.

What is claimed is:

1. An electrical connector, comprising:
   a first connector section comprising a first housing part in which a first terminal is disposed therein, wherein the first connector section is to be mounted into a connector mounting hole provided in a stationary member having a screw hole therein; and a second connector section disposing a second terminal and including comprising a second housing part capable of being fitted on the first housing part and in which a second terminal disposed therein, wherein:

the first terminal and the second terminal are connected to each other at a fitting complete position of the first housing part and the second housing part;

the connector mounting hole and the first housing part are provided with a rotation angle restricting mechanism which allows the first housing part to be inserted into the connector mounting hole only when a rotation angle of the first housing part about an axial direction of the first housing part relative to the connector mounting hole is at a predetermined rotation angle;

the first housing part is provided, on an outer circumference thereof, with a thread fastening component whose axial movement is restricted with respect to the first housing part by a pair of position restricting walls and which is rotatably movable on the outer circumference of the first housing part and capable of being screwed into the screw hole of the connector mounting hole; and the first housing part is thread fastened to the connector mounting hole by screwing the thread fastening component into the screw hole of the connector mounting hole while rotation of the first housing part is restricted relative to the connector mounting hole by the rotation angle restricting mechanism at the predetermined rotation angle;

wherein the thread fastening component includes a bolt, and wherein an outer circumferential surface of the bolt is formed with a screw part.

2. The electrical connector of claim 1, wherein the pair of position restricting walls are provided so as to protrude from the outer circumference of the first housing part on both sides of the thread fastening component in the axial direction of the thread fastening component, thereby restricting the axial movement of the thread fastening component relative to the first housing part, wherein at least one of the pair of position restricting walls permits a movement of the thread fastening component from an end of the first housing part to a position where the thread fastening component is to be arranged and also inhibits a movement of the thread fastening component from the position where the thread fastening component is to be arranged to the end of the first housing part.

3. The electrical connector of claim 1, wherein the rotation angle restricting mechanism comprises:

a key groove provided in one of the connector mounting hole and the first housing part; and a key protrusion provided in the other of the connector mounting hole and the first housing part.

* * * * *